United States Patent Office 3,325,699
Patented June 13, 1967

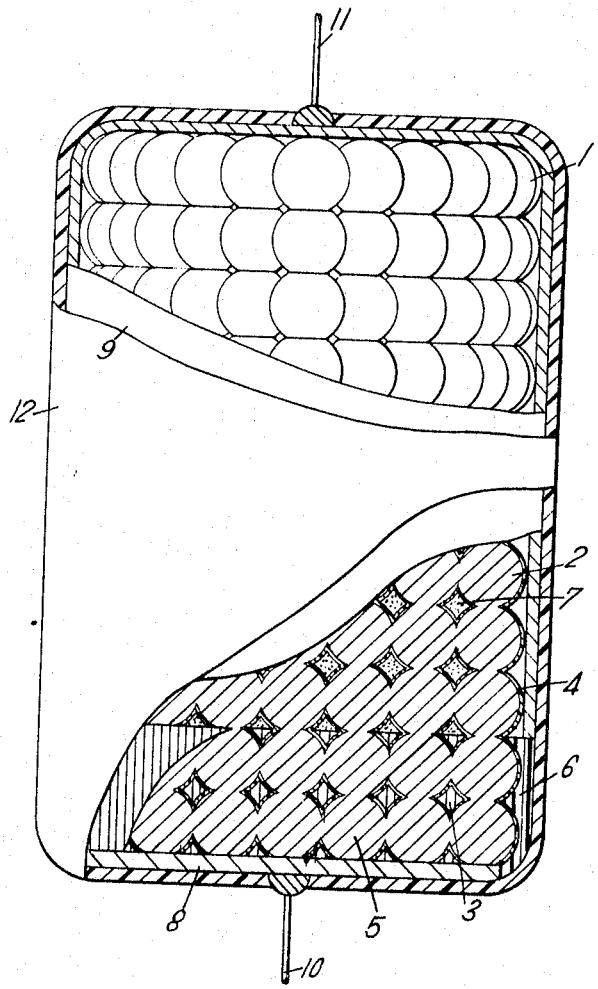

3,325,699
POROUS CAPACITOR WITH ANODE CONNECTION OVER SUBSTANTIAL AND INSULATED AREA
Norman Joseph Hellicar, London, England, assignor to International Standard Electric Corporation, New York, N.Y., a corporation of Delaware
Filed Nov. 16, 1964, Ser. No. 411,416
Claims priority, application Great Britain, Jan. 31, 1964, 4,199/64
6 Claims. (Cl. 317—230)

ABSTRACT OF THE DISCLOSURE

The invention herein provides an anode connection to the conductive core material of a porous capacitor by blocking off the pores adjacent to a surface area by means of silicone rubber and ohmic contact is made to the core at a groundoff portion thereof.

---

Ceramic capacitors and methods of making them are known wherein a ceramic body, which may be of granular material, is formed by sintering the granules together and chemically reducing the body to render it conductive, where electrodes are fired on to different surface portions of the body in an oxidizing atmosphere, and the surface layers underneath the respective electrodes are reoxidized to form dielectric layers.

It is an object of the present invention to form capacitors with ceramic bodies somewhat in accord with known techniques, but with a considerably increased space factor.

The increased space factor, a capacitance-per-unit-volume increase is realized by enlarging the effective surface area of the ceramic body and this is achieved by adopting a sintered ball, porous structure for the ceramic body. Such a body, partly dense and partly porous, will have a very large surface area.

The invention relates to capacitors, and in particular to ceramic capacitors.

According to the present invention there is provided a capacitor including a body having a porous electrically conductive core coated with dielectric, the pores of the body being lined by the dielectric coating and the dielectric coating being covered with solid conductive material except for a surface portion of the body, wherein the pores of the said surface portion are impregnated with solid insulating material and an electrode is secured in ohmic contact with the conductive core and is insulated from the said solid conductive material by means of the insulating impregnating material.

A method of forming the capacitor disclosed in the present invention is set forth in a copending application No. 411,415, filed Nov. 16, 1964, for "Ceramic Capacitors," by Norman J. Hellicar. As recited in said copending application, a ceramic capacitor body is formed from a composition of barium titanate with which lanthanum titanate has been mixed. Ceramic grains of substantially uniform size and spherical shape are used. Ohmic contacts are deposited by evaporation or sputtering techniques. Particle sizes are graded, then mechanically separated and those of same sizes are placed in a drying oven to remove camphor. Next the grains are presintered. After presintering, the grains are passed through a sieve and washed. Before the granular material is shaped, it is cooled with a lubricant, and an ether and camphor solution is introduced, and then it is agitated in a rotary device until the ether is evaporated. The grains are then camphor coated and ready for compaction into a desired form. The grains, now loose and camphored, are pressed into the required shape of the capacitor body. Finally, the formed body is sintered together under a controlled temperature providing a body having a requisite porosity.

An embodiment of the invention will be described by way of an example with reference to the accompanying drawing which is a diagrammatic view, in part section, of a capacitor according to the invention.

A body 1 has a porous electrically conductive core 2 formed of spherical grains which are joined to one another so as to leave the pores 3 between them; as set forth in the referenced copending application, the granular structure may be composed of barium titanate with which lanthanum titanate has been mixed. The pores 3 are lined with and the exterior grain surfaces are covered with a continuous dielectric coating 4. At one end of the body a portion 5 adjacent the end surface is impregnated with solid insulating material 6 such as silicone rubber so that pores of this portion are blanked-off from the remainder of the body. According to the referenced copending application, a correct and controlled sintering temperature provides a ceramic body having a porosity between 20% and 26%, thus the silicone rubber insulating material freely flows between and through the cores of end portion 5. The remainder of the body has the dielectric coating 4 covered with conductive material 7. The end surface of the portion 5 of the body has been ground to expose the conductive core and an electrode 8 provides ohmic contact to the core. The electrode 8 is insulated from the conductive material 7 by the insulating material 6. The conductive material 7 provides the other electrode of the capacitor and it is normally convenient to deposit in contact with this material a second conductive layer 9 to which electrical connection can be made. Lead wires 10 and 11 are soldered to the electrode 8 and to the conductive layer 9, respectively. The body is encased in encapsulating material 12.

In one preferred embodiment, the grains are spheres of high dielectric constant ceramic material, sintered together to form the porous core 2 and chemically reduced to be conductive. The dielectric coating 4 is formed by reoxidation of the surfaces of the ceramic material. In order to impregnate the portion 5 of the body with insulating material it is dipped, to the required depth, into a bath containing silastomer and a catalyst. After dipping, the body 1 is stood up on its other end and the impregnant left to cure in air at room temperature. After the silastomer has been cured the remainder of the body 1 is impregnated, by a technique similar to that used in the manufacture of tantalum capacitors, with a solid semiconductive composition of manganese dioxide, which forms the conductive material 7 and provides means, when the capacitor is suitably polarised, for healing electrical breakdown of the dielectric.

The electrode 8 and the conductive layer 9 are formed by simultaneous evaporation, in vacuum apparatus, of chromium and silver. If desired a coating of colloidal silver may be applied to the codeposited chrome-silver surfaces. As an alternative to the codeposition of chromium and silver to form the electrode 8, and/or the conductive surface 9, aluminium, nickel, copper, silver or gold may be applied by known evaporation or sputtering techniques.

It is to be understood that the foregoing description of specific examples of this invention is not to be considered as a limitation of its scope.

What I claim is:
1. A capacitor comprising a porous electrically conductive core, an uninterrupted dielectric coating lining the pores of said core and covering a relatively large portion of the surface area thereof, an electrically conductive electrode secured in ohmic contact with said core over a relatively small portion of its surface area, a solid insulating material impregnating the pores in the surface of the core covered by said electrode and insulatively covering the adjacent surface of the core around the edges of said electrode, and a solid electrically conductive electrode material overlying the dielectric coating within the pores and on said relatively large portion of the surface area of the core.

2. A capacitor as claimed in claim 1, wherein the conductive core is formed of spherical grains and the dielectric coating is an oxide layer on the grains.

3. A capacitor as claimed in claim 2, wherein the conductive impregnating material is a semiconductive oxide, the semiconductive oxide together with the dielectric coating being such that electrical breakdown of the dielectric is healed by the semiconductive oxide when the capacitor is operated with a D.C. polarising potential.

4. A capacitor, according to claim 1, wherein the solid insulating material is silicone rubber.

5. The method of manufacture of a capacitor including the steps of:
   mixing together lanthanum titanate and barium titanate in desired molecular proportions in the form of a powder;
   adding a binder to the powder;
   subjecting said powder and binder to rotation and agitation to produce spherical agglomerates;
   selecting spherical agglomerates of uniform size and firing them to a temperature such that each is caused to adhere together to form a spherical grain having strength such that it will withstand, without crushing, subsequent compacting with other such grains, but which will yet sinter together with said other such grains;
   compacting said spherical grains into a porous body of desired shape;
   sintering together the compacted grains;
   firing the porous body in a reducing atmosphere;
   subjecting the body to reoxidation at a temperature and for a period of time to produce a desired capacitance and resistivity of the reoxidized layer;
   impregnating the pores of the porous body adjacent an exterior surface thereof with insulating material;
   coating the remaining surface of the body, including the pores, with a semi-conductor oxide; and exposing the inner conductive core of the body at a given surface portion and forming a metallic layer onto the exposed conductive core.

6. The method of manufacture of a capacitor, according to claim 5, including the further step of:
   forming a metallic layer onto a given surface portion of said coating of semi-conductor oxide.

No references cited.

JAMES D. KALLAM, *Primary Examiner.*

JOHN E. BURNS, D. J. BADER, *Assistant Examiners.*